(12) United States Patent  
Wang et al.

(10) Patent No.: US 11,079,057 B2  
(45) Date of Patent: Aug. 3, 2021

(54) TRENCHLESS REHABILITATION DEVICE FOR DISCONNECTS ON LARGE-DIAMETER CONCRETE DRAINAGE PIPE AND METHOD THEREOF

(71) Applicants: WELEAD Infrastructure Engineering Technology (Zhengzhou), Ltd., Henan (CN); SAFEKEY Engineering Technology (Zhengzhou), Ltd., Henan (CN)

(72) Inventors: Fuming Wang, Henan (CN); Hongyuan Fang, Henan (CN); Peng Zhao, Henan (CN); Yanhui Pan, Henan (CN); Bin Li, Henan (CN); Hang He, Henan (CN)

(73) Assignees: WELEAD Infrastructure Engineering Technology (Zhengzhou), Ltd., Henan (CN); SAFEKEY Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/897,960

(22) Filed: Jun. 10, 2020

(65) Prior Publication Data

US 2020/0300401 A1  Sep. 24, 2020

(30) Foreign Application Priority Data

Sep. 25, 2019  (CN) .......................... 201910911303.1

(51) Int. Cl.
*F16L 55/07* (2006.01)
*F16L 55/13* (2006.01)
(Continued)

(52) U.S. Cl.
CPC ............... *F16L 55/07* (2013.01); *F16L 55/13* (2013.01); *F16L 55/163* (2013.01); *F16L 55/164* (2013.01); *F16L 55/18* (2013.01)

(58) Field of Classification Search
CPC ..... F16L 55/1653; F16L 55/163; F16L 55/07; F16L 55/13; F16L 55/164; F16L 55/18; E03F 2003/065
See application file for complete search history.

(56) References Cited

U.S. PATENT DOCUMENTS 4,346,922 A * 8/1982 Ohtsuga ................ F16L 55/163
138/97
4,370,113 A * 1/1983 Nakashin ................ F16L 55/18
104/138.2
(Continued)

*Primary Examiner* — Carib A Oquendo

(57) ABSTRACT

A trenchless rehabilitation device for disconnects on large-diameter concrete drainage pipe and method thereof is provided; which includes: a pipe CCTV, a water blocking device, a lining repairing permanent structure, and a grouting device. The pipe CCTV is configured to determine the location of the pipe disconnection; the water blocking device is configured to form the working space; then the rubber seal lining short tube and multiple expanded round fixed steel plates are configured to form the inner repair permanent structure, and the grouting equipment is configured to insert the expanded round fixed steel plates. The grouting holes are configured to polymer grouting on the periphery of the pipe disconnection and the soil void. The trenchless repair process provided by the present invention can form a composite pipeline disjointed repair structure of inner repair permanent structure and polymer grouting material.

10 Claims, 3 Drawing Sheets

(51) Int. Cl.
*F16L 55/163* (2006.01)
*F16L 55/164* (2006.01)
*F16L 55/18* (2006.01)

(56) References Cited

U.S. PATENT DOCUMENTS

| | | | | |
|---|---|---|---|---|
| 5,351,720 | A | * | 10/1994 | Maimets ............... F16L 55/163 138/98 |
| 8,585,323 | B2 | * | 11/2013 | Lee ....................... F16L 55/164 405/184.1 |
| 9,175,798 | B1 | * | 11/2015 | Thompson ............ F16L 55/163 |
| 2014/0270968 | A1 | * | 9/2014 | Kiest, Jr. ............. B29C 35/0805 405/184.2 |
| 2017/0023167 | A1 | * | 1/2017 | Kartanson ............ F16L 55/162 |
| 2017/0122484 | A1 | * | 5/2017 | Maimets ............. F16L 55/1657 |

\* cited by examiner

TRENCHLESS REHABILITATION DEVICE FOR DISCONNECTS ON LARGE-DIAMETER CONCRETE DRAINAGE PIPE AND METHOD THEREOF

CROSS REFERENCE OF RELATED APPLICATION

The present application claims priority under 35 U.S.C. 119(a-d) to CN 201910911303.1, filed Sep. 25, 2019.

BACKGROUND OF THE PRESENT INVENTION

Field of Invention

The invention relates to the technical field of trenchless repair of pipelines, particular to a trenchless rehabilitation device for disconnections on large-diameter concrete drainage pipe with a diameter over 800 mm and the method thereof.

Description of Related Arts

Drainage pipe network, as an important infrastructure in modern cities, plays a pivotal role in the process of urban development. It has undertaken important responsibilities such as drainage and sewage, and its overall construction scale has become increasingly large. However, with the increase of operating time, the drainage pipes will be damaged to varying degrees and should be repaired in time to prevent greater harm to the city's economy and traffic safety, especially the disconnection of large diameter pipes (DN>800 mm). This kind of disease caused by the construction process or the natural environment will cause pollution of the soil environment due to the leakage of sewage, and the groundwater flow causes the surrounding soil flowing into the pipeline, which will cause the hazard of emptying for a long time, and eventually lead to structural damage to the superstructure and pavement. Therefore, the pipeline disconnection must be repaired to ensure the normal operation of the pipeline network and the safety of road traffic.

The current restoration solutions for pipeline disconnection mainly include two categories: the first category is to excavate the soil to repair the pipe network and deal with it in a targeted position, but the conditions are strongly limited, and it is suitable for small crowds, no buildings nearby, and open construction site. However, at this stage, the drainage pipes laid under the city are mostly old pipes, which are prone to damage. If traditional excavation and repair techniques are used, it will not only consume huge resources, but also affect residents' lives and traffic. Therefore, trenchless pipes repair technology also came into being. It has the advantages of fast construction speed, low cost, and small impact on the environment. With the continuous development of technology, the application is becoming more and more common.

Conventional trenchless repair technologies for large-diameter pipelines generally include: ① Pipeline interstitial repair technology, which inserts new pipes into old pipes by pulling and fills gaps, which is the earliest and easiest trenchless repair method; ② Cured-in-Place-Pipe (CIPP), which is a repair method of pulling a hose impregnated with thermosetting resin into an old pipe and curing it by ultraviolet heating to form a pipe lining, but the technology is costly and it is difficult for operators and the requirements are high; ③ lining method, which uses the physical or chemical properties of the new pipe, and puts the new pipes into the old pipe through different processes, so that the new pipes are lined in the old pipes.

There are also many related reports on trenchless repair processes in the conventional arts.

For example: Contrast Document 1, a Chinese patent application with a publication number CN 105371049A discloses a trenchless repair process for pipelines. The technical point of this solution is mainly to use CCTV (closed-circuit television) to determine whether there are leaks, misalignments, blockages, bends, etc. in the pipeline, and then the pipeline Internal repair, the specific repair process relates to an improved pipe interstitial repair method.

Contrast Document 2: a Chinese patent application with a publication number CN 102235565A discloses a trenchless repair method for an inverted liner-fitting underground pipeline. This solution uses CCTV equipment to detect the interior of the pipeline and then combines it with the liner-fitting repair.

However, the above-mentioned repair technology has high requirements for conditions, has certain limitations, and cannot repair soil voids caused by pipe disconnection. Therefore, a new type of trenchless repair technology for large-diameter drain pipe disconnection needs to be developed.

SUMMARY OF THE PRESENT INVENTION

The technical problem to be solved by the present invention is to propose a trenchless rehabilitation device for disconnects on large-diameter concrete drainage pipe and method thereof, which is fixed by pipe closed circuit television (CCTV), polymer grouting, and a rubber-lined short pipe and an expanded circle The method of trenchless repair of concrete drainage pipe disconnection is implemented by methods such as steel sheet composition and lining repair of permanent structure. The purpose is to solve the concrete drainage pipe disconnection disease and the voiding disease caused by the concrete drainage pipe disconnection. Sewage leakage and soil loss around pipes cause greater damage to the upper pavement structure. It is especially suitable for trenchless repair of large-diameter concrete drainage pipes with DN>800 mm.

In order to solve the above technical problem the present invention adopts the following technical solutions:

The present invention provides a trenchless rehabilitation device for disconnects on large-diameter concrete drainage pipe and method thereof, comprising: a pipe CCTV (closed-circuit television), a water blocking device, a lining repair permanent structure, and a grouting device, wherein:

the pipe CCTV is configured to determine whether there is a disconnection disease in a pipeline and determine a disconnected position of a pipeline;

the water blocking device is configured to block water to form a working space, comprising: a water stop air bag and an air compressor connected to the water stop air bag, and the water stop air bag is provided on an upstream of the disconnected position;

the inner lining repair permanent structure is configured to repair the disconnection disease of the pipeline, comprising: a rubber seal lining short pipe and a plurality of expanded round fixed steel plates installed on an internal wall of the rubber sealed lining short pipe; wherein the expanded round fixed steel plates are annular structures; the plurality of the expanded round fixed steel plates are fixedly provided in an annular array on the internal wall of the rubber seal lining short pipe; grouting holes are provided in a center of the expanded round fixed steel plates, and the grouting holes are for polymer grouting a periphery of a disconnected pipeline and soil void; two circumferential ends of the expanded round fixed steel plates are respectively provided with a plurality of bolt holes for fixing to the internal wall of the rubber seal lining short pipe through expansion screws; and the grouting equipment is configured to insert the grouting holes of the pipeline to perform polymer grouting on the disconnected pipeline and the void soil.

Furthermore, the water-stop airbag includes an airbag body and an inflation mouth provided on one side of the airbag body. One end of the inflation mouth is provided in the body of the airbag, and the other end is connected to one valve port of the three-prong valve. It is connected with a pressure gauge, and the other is connected with an external air compressor through an inflatable hose. An inflatable valve is provided on the inflatable hose.

The pressure gauge is used to monitor the pressure in the water-proof airbag; the inflation valve is used to control the flow of inflation. Generally, the airbag body uses a rubber material made of a polymer synthetic material such as rubber and fiber fabric through a high-temperature vulcanization process. Preferably, the shape of the airbag body is a cylindrical shape adapted to the diameter of the tube.

Preferably, the airbag body is further provided with a pulling strap, which is convenient for pulling the water-stop airbag into/out of the pipeline.

Preferably, the inner wall of the rubber-sealed lining short tube is provided with 4 expanded round fixed steel plates, the expanded-round fixed steel plate has a circular structure with an arc of 75-85°, and the expanded round-fixed steel plate is provided on the upper part of the inner wall of the rubber sealed inner short tube. The grouting hole is directly opposite the top of the rubber-sealed lining short tube, and 4 expanded and fixed steel plates are fixed in a circular array on the inner wall of the rubber-sealed lining short tube.

More preferably, the expanded round fixed steel plate is a hoop structure with an arc of 80°.

Furthermore, the width of the expanded round fixed steel plate is the same as the width of the rubber-sealed lining short pipe, and the diameter of the rubber-sealed lining short pipe is determined according to the effective diameter of the pipe after it is disconnected. In the solution of the present invention, the effective diameter refers to the diameter of the gap generated after the two pipes are disjointed and staggered.

Furthermore, the grouting equipment includes a grouting pipe and an external grouting machine. The grouting machine is provided with a grouting gun, and the grouting pipe is connected to the grouting gun of the grouting machine. The grouting machine is usually mounted on a dedicated grouting car.

The present invention also provides a trenchless repair method using the above-mentioned trenchless repair device for the large-diameter concrete drainage pipe disconnection, which specifically includes the following steps:

S1. moving inside the drainage pipeline by the pipe CCTV; based on the CCTV detection results, detecting whether there is a disconnection disease, after finding and determining the location of the pipeline disconnection, the pipe CCTV is pulled out of the pipe. The traction of the pipe CCTV is generally connected by a traction rope. Move to the towing equipment;

S2: after the upstream shut-off valve at the disconnected position of the pipeline stops the water, pulling the water-stop bladder into the drainage pipe, inflating the water-stop bladder by an air compressor connected to the drain pipe through the inflation hose, and intercepting the water to form a work space;

S3: shortly pulling the rubber seal lining into the pipe disconnection, and fixing a plurality of expanded and fixed steel plates in a circular array on the inner wall of the rubber seal lining short pipe to form a permanent repair structure of the lining;

S4: by a hand-held electric drill, inserting the grouting hole of the expanded and fixed steel plate, pierce the rubber-sealed lined short pipe and drill to the peripheral pipe disconnection to obtain the grouting channel; by the grouting equipment, disconnecting the pipe from the periphery and soil; performing polymer grouting in the empty space, wherein the polymer quickly penetrates and expands in the disjointed and voided areas to form a polymer grout; and S5: after the polymer is completely cured, pulling out the grouting equipment, and then deflating the water-stop air bag to a flat shape, and then pulling out the water-stop air bag from the tube.

Specifically, in step S3, the inner wall of the rubber-sealed lining short pipe is provided with four expanded round fixed steel plates, and the expanded round fixed steel plates are annular structures with an arc of 75-85°, and the four expanded round fixed steel plates are arranged in an annular array respectively. At the pipe top, both sides of the pipe and the pipe bottom of the inner wall of the rubber-sealed short tube, the grouting hole of the expanded fixed steel plate at the top of the pipe faces the top of the rubber-sealed short tube.

Furthermore, in step S2, a three-pronged valve is provided between the inflation nozzle of the water-stop airbag and the external air compressor. One valve port of the three-prong valve is connected to the inflation nozzle, one valve port is connected to the pressure gauge, and the other valve port is connected to the inflation hose. An inflation valve is provided on the inflation hose, and the water-stop air hag is connected to the external air compressor through an inflation tube. During the process of inflating the water-stop air bag, the pressure in the water-stop air bag is monitored by a pressure gauge, and at the same time controlled by the inflation valve The inflated flow makes the water-stop airbag fit tightly on the inner wall of the pipe and plays a water blocking role.

Furthermore, in step S4, the grouting equipment includes a grouting machine and a grouting pipe. The grouting machine is placed near the inspection well, and then the grouting gun of the grouting machine is connected to the grouting pipe deep into the grouting channel. The pipe grouts the polymer on the periphery of the pipe disconnection and the soil void.

Compared with the prior art, the beneficial effects of the present invention are as follows.

1. The trenchless repairing device for the disconnection of a large-diameter concrete drainage pipe provided by the present invention includes: a pipe CCTV, a water blocking device, a lining repairing permanent structure, and a grouting device. The pipe CCTV detects whether there is a disconnection disease in the pipeline to find and determine the location of the disconnection of the pipeline. The working space is formed by the water blocking equipment. The lining repairs the permanent structure to repair the disconnection disease of the concrete drainage pipeline. The soil s evacuated to repair and strengthen the soil.

2. Compared with the prior art, the trenchless repair process provided by the present invention can form a composite pipe "disconnection repair permanent structure+ polymer grouting" composed of a "rubber-lined short pipe and an expanded round fixed steel plate". The structure can realize the trenchless repair of the disconnection of the large-diameter concrete drainage pipe. It can not only quickly repair the disconnection disease of the large-diameter concrete drainage pipe, but also repair the soil voiding disease caused by the disconnection of the pipeline and strengthen the peripheral soil of the pipeline disease. It can form a stable support structure, and the construction process has little impact on the upper pavement and surrounding buildings. It is especially suitable for trenchless repair of large-diameter concrete drainage pipes with a diameter greater than 800 mm.

3. The disjointed trenchless repair process for the large-diameter concrete drainage pipe of the present invention has the advantages of low cost, reliable technology, and high quality stability.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those of ordinary skill in the art, other drawings can be obtained based on these drawings without paying creative labor.

DRAWINGS DESCRIPTION

Figure 1:
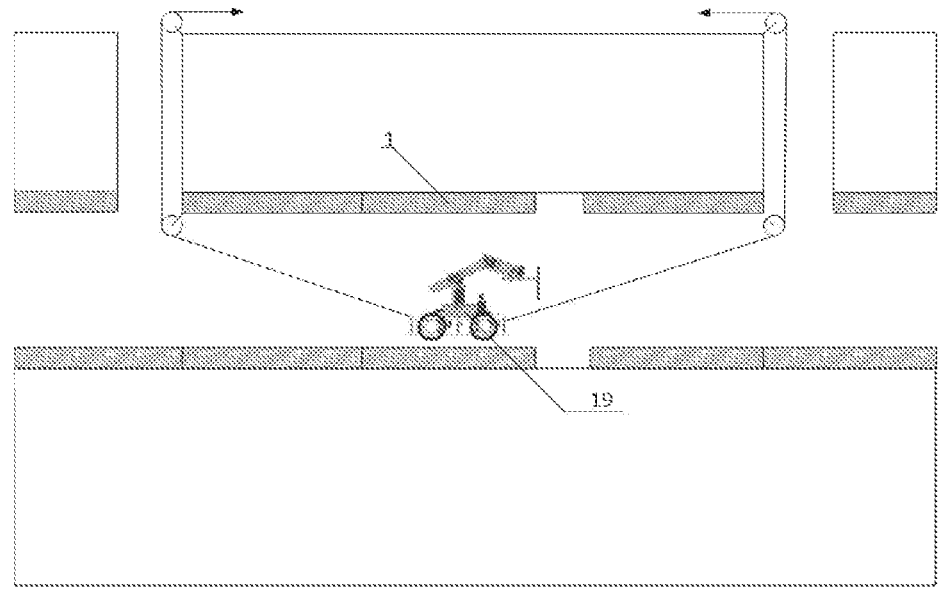
FIG. 1 is a schematic diagram of a pipe CCTV detecting a disconnection of a pipeline according to a preferred embodiment of the present invention.

1—concrete drainage pipe; 2—polymer grouting material; 3—grouting hole; 4—expanded round fixed steel plate; 5—rubber seal lined short pipe; 6—expansion screw; 7—grouting pipe; 8—bolt hole; 9—inflation nozzle; 10—inflation hose; 11—inflation valve; 12—pressure gauge; 13—airbag body; 14—pulling belt, 15—three-prong valve; 16—water stop airbag; 17—grouting machine; 18—air compressor; 19—pipe CCTV.

DETAILED DESCRIPTION OF THE PREFERRED EMBODIMENT

In order to better explain the content of the invention, the present invention is further verified by specific examples below. It is specifically illustrated here that the examples are only intended to describe the present invention more directly, they are only a part of the present invention, and should not be construed as limiting the present invention in any way.

In the description of the present invention, it should be noted that the terms "center", "up", "down", "left", "right", "vertical", "horizontal", "inside", "outside", etc. The indicated orientation or positional relationship is based on the orientation or positional relationship shown in the drawings, and is only for the convenience of describing the utility model and simplified description, and does not indicate or imply that the device or element referred to must have a specific orientation, a specific The azimuth structure and operation cannot be understood as a limitation to the present invention. In addition, the terms "first," "second," and "third" are used for descriptive purposes only, and should not be construed to indicate or imply relative importance.

In the description of the present invention, it should also be noted that the terms "setup", "installation", "connected", and "connected" should be understood in a broad sense, for example, fixed connections, unless otherwise specified and limited. It can also be a detachable connection or an integral connection: it can be a mechanical connection or an electrical connection; it can be directly connected or indirectly connected through an intermediate medium, or it can be the internal communication of two components. For those of ordinary skill in the art, the specific meanings of the above terms in the present utility model can be understood according to specific situations.

EXAMPLE 1

Figure 2:
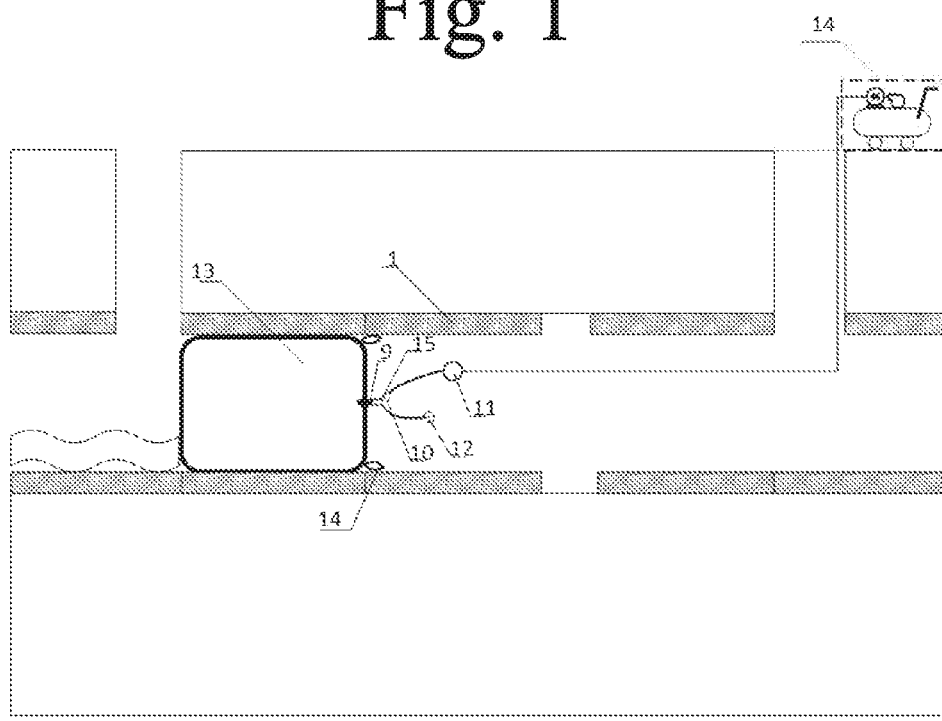
FIG. 2 is a longitudinal cross-sectional view of a plugging of a water-proof airbag pipe according to the present invention.
Figure 3:
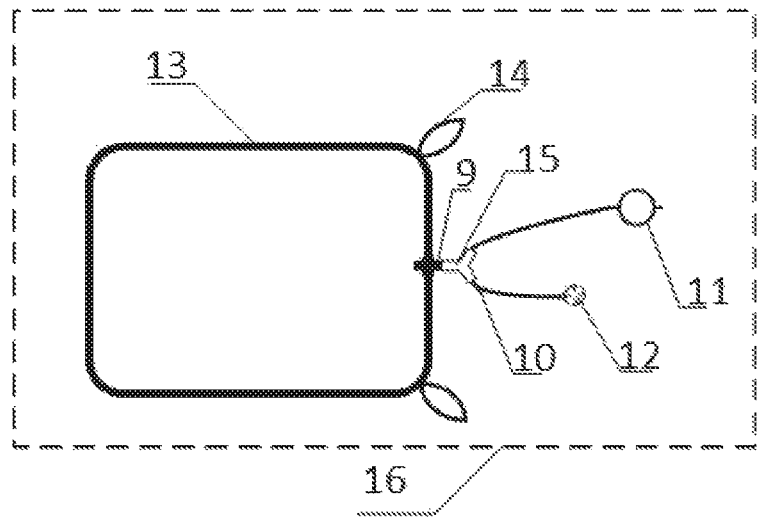
FIG. 3 is a schematic structural diagram of a water-proof air hag according to the present invention.
Figure 4:
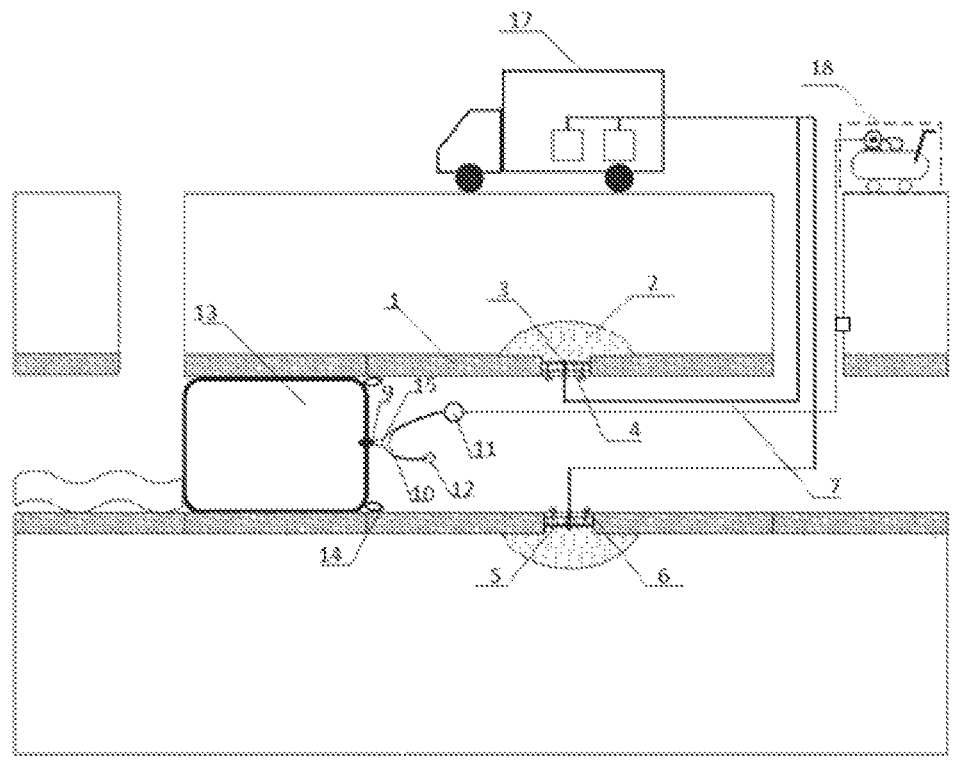
FIG. 4 is a schematic diagram of an internal grouting repair pipeline disconnection of the present invention.
Figure 5:
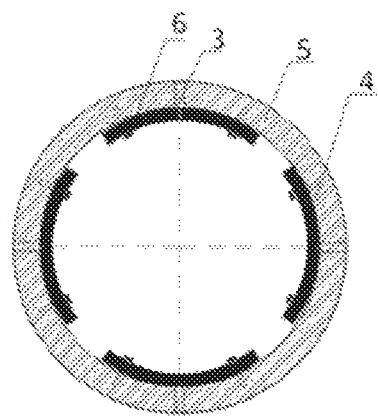
FIG. 5 is a schematic cross-sectional view of a combination of a rubber-sealed lining short tube and an expanded round fixed steel plate according to the present invention.
Figure 6:
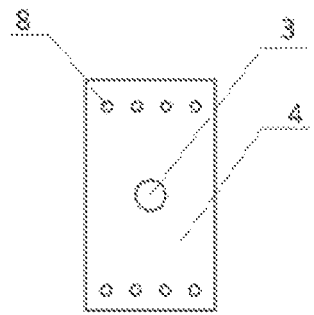
FIG. 6 is a front view of the expanded and fixed steel plate of the present invention.
Figure 7:
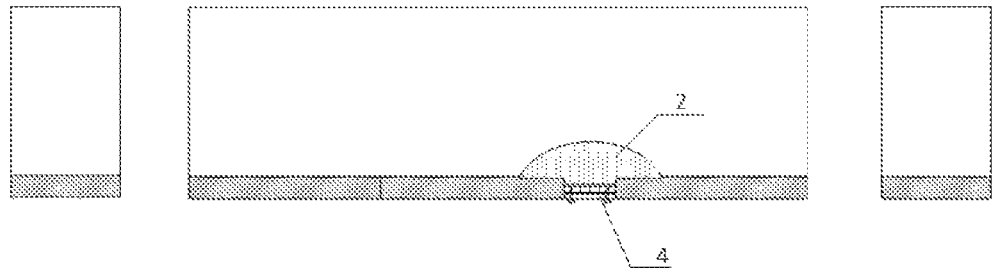
FIG. 7 is an effect diagram of a repair process provided by the present invention.
Figure 7:
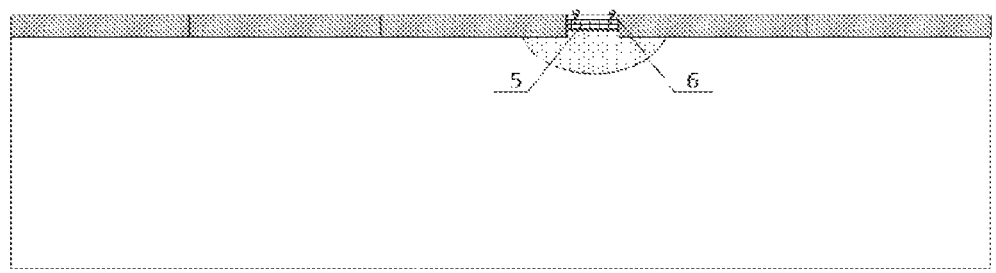

As shown in FIG. 1 to FIG. 6, this embodiment provides a trenchless repair device for a large-diameter concrete drainage pipe disconnection, which includes: a pipe CCTV 19, a water blocking device, a permanent structure for lining repair, and Pulp equipment, of which:

A pipe CCTV 19 is used to determine whether a concrete drainage pipeline 1 has a disjointed disease and determine a disjointed location of the pipeline;

The water blocking device is used for blocking water to form a working space, and includes a water stop air bag 16 and an air compressor 18 connected to the water stop air bag 16. The water stop air bag 16 is disposed upstream of the disconnected position;

As a preferred embodiment, the water stop airbag 16 in this embodiment includes an airbag body 13 and an inflation nozzle 9 provided on one side of the airbag body. One end of the inflation nozzle 9 is provided in the airbag body 13, and the other end is connected to a valve port of the three-pronged valve 15. Connection, the other two valve ports of the three-way valve 15 are connected to the pressure gauge 12 and the other is connected to the external air compressor 18 through an inflation hose 10, which is provided with an inflation valve 11; the airbag body 13 is also provided with There is a pull band 14; the shape of the airbag body 13 is a cylindrical shape adapted to the diameter of the pipe.

The pressure gauge 12 is used to monitor the pressure in the water-proof airbag 16; the inflation valve 11 is used to control the flow of inflation. Generally, the airbag body 13 is made of a rubber material made of a polymer synthetic material such as rubber and fiber fabric through a high-temperature vulcanization process.

The inner lining repairs the permanent structure, which is used to repair the pipeline dislocation disease, including the rubber-sealed lining short pipe 5 and a plurality of expanded round fixed steel plates 4 installed on the inner wall of the rubber sealed lining short pipes 5; Structure, a plurality of expanded round fixed steel plates 4 are fixedly arranged in a circular array on the inner wall of the rubber-sealed lining short pipe 5; a grout hole 3 is provided in the center of the expanded round fixed steel plate 4; Polymer grouting is carried out in the hollow of the soil body, and two bolt-shaped holes 8 are respectively provided on the two circumferential ends of the bulged and fixed steel plate 4 for fixing to the inner wall of the rubber-sealed lining short pipe 5 through expansion screws 6;

As a preferred embodiment, in this embodiment, the inner wall of the rubber-sealed lining short pipe 5 is provided with four expanded round fixed steel plates 4, the expanded round fixed steel plate 4 has an annular structure with an arc of 75-85°, and in this embodiment, 80° steel plate, four expanded round fixed steel plates 4 are fixed in an annular array on the inner wall of the rubber-sealed lining short pipe 5, specifically on the top, both sides and bottom of the pipe of the inner wall of the rubber-sealed short pipe 5. The grouting hole 3 of the bulged and fixed steel plate 4 on the upper part of the inner wall of the rubber-sealed short tube 5 faces the top of the rubber-sealed short tube 5 directly. The width of the expanded round fixed steel plate 4 is the same as the width of the rubber seal-lined short pipe 5. The diameter of the rubber seal-lined short pipe 5 is determined according to the effective diameter of the pipe after it is disjointed.

Grouting equipment for inserting grouting polymer into the outer periphery of the pipeline and the soil void in the grouting hole 3; the grouting equipment includes a grouting pipe 7 and an external grouting machine 17, grouting machine 17 is provided with a grouting gun, and the grouting pipe 7 is connected to the grouting gun of the grouting machine 17.

The trenchless rehabilitation device for disconnects on large-diameter concrete drainage pipe and method thereof provided in this embodiment is as follows:

S1. The pipe CCTV 19 moves inside the concrete drainage pipeline 1. Based on the CCTV, the pipeline is detected for disjunction disease. After finding and determining the location of the pipeline dislocation, the pipe CCTV 19 is pulled out of the pipeline; The traction rope is generally connected to the traction equipment for movement.

S2. After the upstream shut-off valve at the disconnected position of the pipeline is stopped, the water-stop bladder 16 is pulled into the concrete drainage pipe 1 by mechanical traction, and connected to the air compressor 18 outside the concrete drainage pipe 1 through the inflatable hose 10 to stop the water The airbag body 13 of the airbag 16 inflates and intercepts water to form a working space;

Specifically, a three-prong valve 15 is provided between the inflation nozzle 9 of the water-proof airbag 16 and the external air compressor 18. One valve port of the three-prong valve 15 is connected to the inflation nozzle 9, one valve port is connected to the pressure gauge 12, and the other valve An air hose 10 is connected to the mouth, and an inflation valve 11 is provided on the air hose 10. The water-proof airbag 16 is connected to the external air compressor 18 through the air-intake tube 10. During inflation of the air-bag body 13 of the water-proof airbag 16, The pressure gauge 12 monitors the pressure in the water-stop airbag 16 and controls the flow of inflation through the inflation valve 11 so that the water-stop airbag 16 can closely fit the inner wall of the concrete drainage pipe 1 and play a water blocking role. The airbag body 13 is further provided with a pulling strap 14 to facilitate pulling the water-stop airbag 16 into out of the pipeline.

S3. Pull the rubber-sealed lining short pipe 5 to the inside of the pipe by mechanical traction, and then manually pull to the dislocation of the concrete drainage pipe 1, and form four ring-shaped expanded steel plates 4 with a circular structure of 80 in an annular shape. The array is fixedly arranged on the inner wall of the rubber-sealed lining short pipe 5, specifically, the pipe top, both sides of the pipe, and the pipe bottom of the inner wall of the rubber-sealed lining short pipe 5 are combined to form a permanent repair structure of the lining; The grouting hole 3 of the steel plate 4 faces the top of the rubber-sealed lining short pipe 5.

S4. Use a hand-held electric drill to insert the grouting hole 3 of the expanded and fixed steel plate 4, pierce the rubber-sealed lining short pipe 5 and drill to the out of place of the outer pipe to obtain the grouting channel. Place the grouting machine 17 in the inspection well. Nearby, the grouting machine 17 is usually mounted on a dedicated grouting vehicle. Then, the grouting gun of the grouting machine 17 is connected to the grouting pipe 7 deep in the grouting channel, and the polymer is grouted to form a polymer grouting material through the grouting pipe 7 to the outer periphery of the pipe disconnection and the soil void 2.

S5. After the polymer is completely cured, pull out the grouting equipment, and then deflate the water-stop airbag 16 to a flat shape, and then pull out the water-stop airbag 16 from the concrete drainage pipe 1.

The trenchless repair process provided by the present invention can form a composite pipe disjointed repair structure of "rubber-lined short pipe and expanded fixed steel plate lined with permanent lining repair+polymer grouting material", which can realize large pipe trenchless repair of disconnected concrete drainage pipelines can not only quickly repair the joints of large diameter concrete drainage pipelines, but also repair soil voids caused by pipeline disconnections, and strengthen the surrounding soil of pipeline diseases, which can form a stable support. Structure, and the construction process has little impact on the upper pavement and surrounding buildings. It is especially suitable for trenchless repair of disconnected large-diameter concrete drainage pipes with a diameter greater than 800 mm, and has the advantages of low cost, reliable technology and high quality stability.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A trenchless rehabilitation device for disconnects on large-diameter concrete drainage pipe, comprising: a pipe CCTV (closed-circuit television), a water blocking device, a lining repair permanent structure, and a grouting device, wherein:

the pipe CCTV is configured to determine whether there is a disconnection disease in the pipeline and determine a disconnected position of a pipeline;

the water blocking device is configured to block water to form a working space, comprising: a water stop air bag and an air compressor connected to the water stop air bag, and the water stop air bag is provided on an upstream of the disconnected position;

the inner lining repair permanent structure is configured to repair the disconnection disease of the pipeline, comprising: a rubber seal lining short pipe and a plurality of expanded round fixed steel plates installed on an internal wall of the rubber sealed lining short pipe; wherein the expanded round fixed steel plates are annular structures; the plurality of the expanded round fixed steel plates are fixedly provided in an annular array on the internal wall of the rubber seal lining short pipe; grouting holes are provided in a center of the expanded round fixed steel plates, and the grouting holes are for polymer grouting a periphery of a disconnected pipeline and soil void; two circumferential ends of the expanded round fixed steel plates are respectively provided with a plurality of bolt holes for fixing to the internal wall of the rubber seal lining short pipe through expansion screws; and the grouting equipment is configured to insert the grouting holes of the pipeline to perform polymer grouting on the disconnected pipeline and the void soil.

2. The trenchless rehabilitation device for disconnects on large-diameter concrete drainage pipe, as recited in claim 1, wherein the water-stop airbag comprises an airbag body and an inflation mouth provided on one side of the airbag body; one end of the inflation mouth is provided in the body of the airbag, and the other end is connected to one valve port of the three-prong valve; it is connected with a pressure gauge, and the other is connected with an external air compressor through an inflatable hose; an inflatable valve is provided on the inflatable hose.

3. The trenchless rehabilitation device for disconnects on large-diameter concrete drainage pipe, as recited in claim 1, wherein the inner wall of the rubber-sealed lining short tube is provided with 4 expanded round fixed steel plates, the expanded-round fixed steel plate has a circular structure with an arc of 75-85°, and the expanded round-fixed steel plate is provided on the upper part of the inner wall of the rubber sealed inner short tube; the grouting hole is directly opposite the top of the rubber-sealed lining short tube, and 4 expanded and fixed steel plates are fixed in a circular array on the inner wall of the rubber-sealed lining short tube.

4. The trenchless rehabilitation device for disconnects on large-diameter concrete drainage pipe, as recited in claim 3, wherein the expanded round fixed steel plate is a hoop structure with an arc of 80 degrees.

5. The trenchless rehabilitation device for disconnects on large-diameter concrete drainage pipe, as recited in claim 3, wherein The width of the expanded round fixed steel plate is the same as the width of the rubber-sealed lining short pipe, and the diameter of the rubber-sealed lining short pipe is determined according to the effective diameter of the pipe after it is disconnected.

6. The trenchless rehabilitation device for disconnects on large-diameter concrete drainage pipe, as recited in claim 1, wherein the grouting equipment includes a grouting pipe and an external grouting machine; the grouting machine is provided with a grouting gun, and the grouting pipe is connected to the grouting gun of the grouting machine.

7. A trenchless rehabilitation method for disconnects on large-diameter concrete drainage pipe, comprising steps of:
S1: moving the pipe CCTV inside the drainage pipeline; detecting whether there is a disconnection disease in the pipeline by a CCTV closed-circuit television; finding and determining a location of the pipeline disconnection, pulling pipe CCTV out of the pipeline;
S2: after an upstream shut-off valve at the disconnected position of the pipeline stops the water, pulling a water-stop bladder into the drainage pipe, inflating the water-stop bladder by an air compressor connected to the drain pipe through an inflation hose, and intercepting the water to form a work space;
S3: shortly pulling a rubber seal lining into the pipe disconnection, and fixing a plurality of expanded and fixed steel plates in a circular array on an inner wall of the rubber seal lining short pipe to form a permanent repair structure of the lining;
S4: by a hand-held electric drill, inserting a grouting hole of the expanded and fixed steel plate, pierce the rubber-sealed lined short pipe and drill to the peripheral pipe disconnection to obtain a grouting channel; by a grouting equipment, disconnecting the pipe from the periphery and soil; performing polymer grouting in an empty space, wherein the polymer quickly penetrates and expands in the disjointed and voided areas to form a polymer grout; and
S5: after the polymer injecting is completely cured, pulling out the grouting equipment, and then deflating the water-stop air bag to a flat shape, and then pulling out the water-stop air bag from the tube.

8. The trenchless rehabilitation method for disconnects on the large-diameter concrete drainage pipe, as recited in claim 7, wherein in step S3, the inner wall of the rubber-sealed lining short pipe is provided with four expanded round fixed steel plates, and the expanded round fixed steel plates have a circular structure with an arc of 75-85°; at the pipe top, both sides of the pipe and the pipe bottom of the inner wall of the rubber-sealed short tube, the grouting hole of the expanded fixed steel plate at the top of the pipe faces the top of the rubber-sealed short tube.

9. The trenchless rehabilitation method for disconnects on the large-diameter concrete drainage pipe, as recited in claim 7, wherein in step S2, a three-pronged valve is provided between the inflation nozzle of the water-stop airbag and the external air compressor; one valve port of the three-prong valve is connected to the inflation nozzle, one valve port is connected to the pressure gauge, and the other valve port is connected to the inflation hose; an inflation valve is provided on the inflation hose, and the water-stop air bag is connected to the external air compressor through an inflation tube; during the process of inflating the water-stop air bag, the pressure in the water-stop air bag is monitored by a pressure gauge, and at the same time controlled by the inflation valve The inflated flow makes the water-stop airbag fit tightly on the inner wall of the pipe and plays a water blocking role.

10. The trenchless rehabilitation method for disconnects on the large-diameter concrete drainage pipe, as recited in claim 7, wherein in step S4, the grouting equipment includes a grouting machine and a grouting pipe; the grouting machine is placed near the inspection well, and then the grouting gun of the grouting machine is connected to the grouting pipe deep into the grouting channel; polymer grouting of pipe for pipe disconnection and soil voids.

* * * * *